July 9, 1929. S. M. WECKSTEIN 1,720,457
RAILWAY CAR JOURNAL BEARING CONSTRUCTION
Filed March 12, 1928
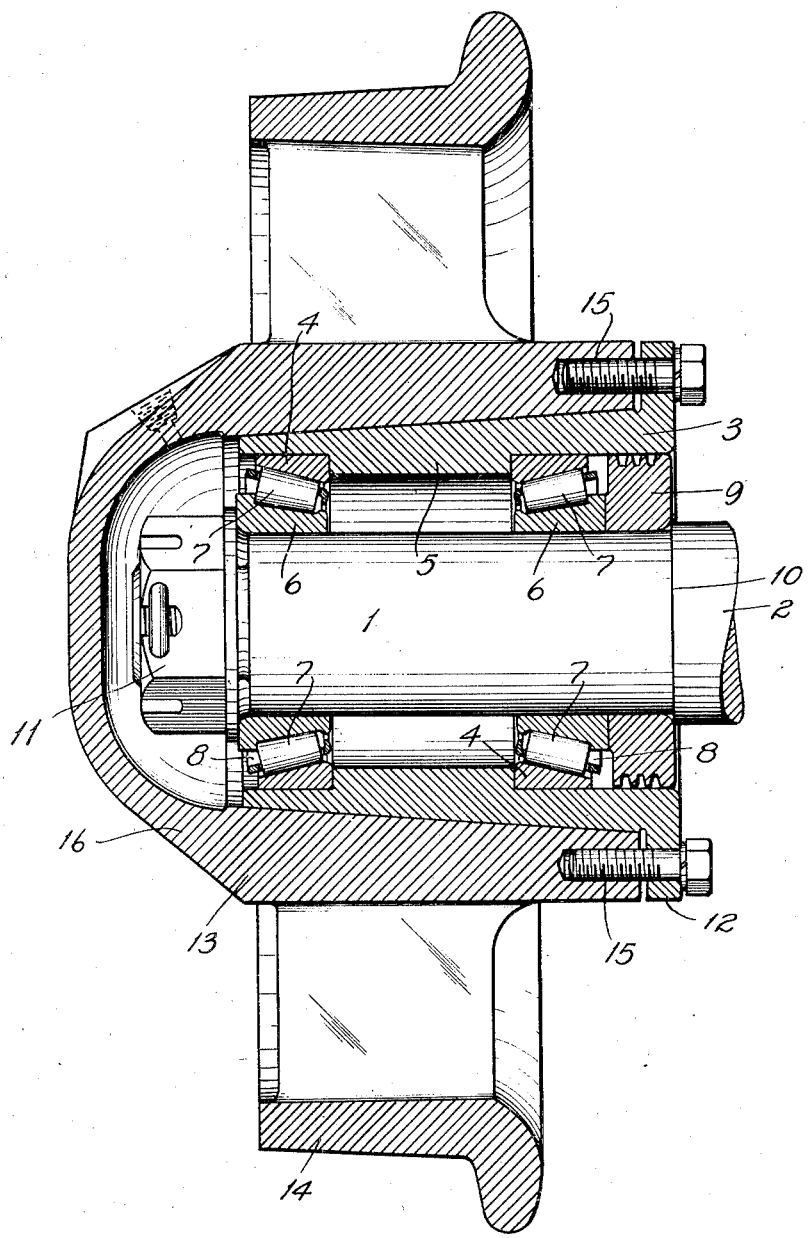
INVENTOR:
Samson M. Weckstein,
by Carr Carr +Gravely,
HIS ATTORNEYS.

Patented July 9, 1929.

1,720,457

UNITED STATES PATENT OFFICE.

SAMSON M. WECKSTEIN, OF CANTON, OHIO, ASSIGNOR TO THE TIMKEN ROLLER BEARING COMPANY, OF CANTON, OHIO, A CORPORATION OF OHIO.

RAILWAY-CAR JOURNAL-BEARING CONSTRUCTION.

Application filed March 12, 1928. Serial No. 260,943.

My invention relates to railway car journal bearing constructions, particularly to mine car journal constructions. It has for its principal objects a construction in which the bearings are entirely protected from dirt and in which the lubricant is retained in the bearings, and a construction in which the car wheel may be removed without disturbing the adjustment of the bearings.

The invention consists principally in adjustably mounting a railway car wheel on a bearing housing member and securing the car wheel to said bearing housing member in such a way as not to interfere with the adjustment of the bearings. The invention further consists in the railway car journal construction and in the parts and combinations and arrangements of parts hereinafter described and claimed.

The accompanying drawing is a longitudinal sectional view of a railway car journal construction embodying my invention.

The reduced end portion 1 of a mine car or other railway car axle 2 extends into a housing 3 and an anti-friction bearing is interposed between said housing and the car axle. The bearing illustrated in the drawing comprises two taper roller bearings each consisting of a bearing cup 4 mounted against a rib 5 in the bore of the bearing housing 3, a cone 6 mounted on the reduced end portion 1 of the axle 2, bearing rollers 7 interposed between the cup 4 and cone 6 and a cage 8 for the bearing rollers 7.

The innermost bearing cone 6 abuts against a ring 9 that is mounted against a shoulder 10 on the axle 1 and that fits closely in the end of the bore of the housing member 3, thereby preventing egress of lubricant and ingress of foreign matter. The outermost bearing cone 6 is held by means of a nut 11 on the end of the axle. The cones 6 are disposed with their small ends towards each other and both bearings are adjusted and held in position by means of the adjusting nut 11.

The outer surface of the bearing housing 3 is conical and the inner end of the bearing housing (that is, the end adjacent to the car body) is provided with an annular flange 12. The hub portion 13 of the car wheel 14 has a tapered bore fitting on the conical body of the bearing housing 3 and screws 15 extending through said flange and into threaded holes in the hub portion of the wheel serve to draw the wheel tightly onto the bearing housing and hold it in position. The outer portion of the hub 13 is provided with a cap portion 16, said cap portion being illustrated in the drawings as integral with the body of the hub of the wheel. The cap portion may be provided with a lubricant opening that may be closed by means of a threaded plug as indicated in dotted lines in the drawing.

The bearings may be adjusted at the factory when the axle bearings and bearing housings are assembled. The wheel may then be mounted on the bearing housing and secured in position without disturbing the adjustment of the bearings; and the wheel may likewise be removed without disturbing the bearing adjustment. A lubricant enclosure is formed in the bearing housing and hub of the wheel.

What I claim is:

1. A railway car journal bearing construction comprising an axle, a housing for the end of said axle, said housing having a conical outer surface and having an annular flange at its inner end, an anti-friction bearing interposed between said axle and said housing, a car wheel having a hub with a conical bore fitted on said conical housing and screws extending through said housing flange into the hub of the wheel to secure the wheel in place.

2. A railway car journal bearing construction comprising an axle, a housing for the end of said axle, said housing having a conical outer surface and having an annular flange at its inner end, an anti-friction bearing interposed between said axle and said housing, a car wheel having a hub with a conical bore fitted on said conical housing, screws extending through said housing flange into the hub of the wheel to secure the wheel in place, said wheel hub having an integral cap constituting a closure for one end of said housing, and a closure ring for the other end of said housing.

3. A railway car journal bearing construction comprising an axle, a housing for the end of said axle, said housing having a conical outer surface and having an annular flange at its inner end, said housing also having an internal annular flange, taper roller bearings interposed between said axle and said housing, the outer bearing members of said taper roller bearings being seated in said housing against said flange and the inner bearing members being mounted on said axle, means for securing said inner bearing members on said axle, a car wheel having a hub with a conical bore fitted on said conical housing and screws extending through said housing flange into the hub of the wheel to secure the wheel in place.

Signed at Canton, Ohio, this 8th day of March, 1928.

SAMSON M. WECKSTEIN.